(12) United States Patent
King

(10) Patent No.: US 6,473,219 B1
(45) Date of Patent: Oct. 29, 2002

(54) METHOD AND APPARATUS FOR ASYMETRICAL OPTICAL MODULATION

(75) Inventor: Jonathan Paul King, San Jose, CA (US)

(73) Assignee: Big Bear Networks, Inc., Milpitas, CA (US)

( * ) Notice: Subject to any disclaimer, the term of this patent is extended or adjusted under 35 U.S.C. 154(b) by 25 days.

(21) Appl. No.: 09/792,948

(22) Filed: Feb. 26, 2001

(51) Int. Cl.[7] .............................. G02F 1/03; G02F 1/07; G02F 1/01; G02F 1/035; G02B 26/00
(52) U.S. Cl. ........................... 359/245; 359/239; 385/3
(58) Field of Search ................... 359/237–239, 359/245; 385/2, 3, 8, 140

(56) References Cited

U.S. PATENT DOCUMENTS 5,343,324 A * 8/1994 Le et al. ...................... 359/184
6,046,838 A    4/2000 Kou et al. .................... 359/245

FOREIGN PATENT DOCUMENTS

WO    WO 01/26256 A1 * 4/2001

* cited by examiner

Primary Examiner—Jordan Schwartz
Assistant Examiner—William Choi

(57) ABSTRACT

An optical data transmission system using a Mach Zehnder (M-Z) modulator asymmetrically modulates the optical carrier to generate control information to optimize the transmitted optical signal.

20 Claims, 4 Drawing Sheets

METHOD AND APPARATUS FOR ASYMETRICAL OPTICAL MODULATION

FIELD OF INVENTION

This invention pertains to the field of digital optical communications.

BACKGROUND

A typical digital optical communications system includes a transmitter, an optical channel (e.g., optical fiber), and a receiver. Optionally, the optical channel may have one or more elements such as amplifiers to compensate for attenuation due to long distances and other dispersive effects. The transmitter is often constructed of a light source generating an optical carrier and an electro-optical modulator. A common electro-optical modulator is the Mach Zehnder (M-Z) modulator. The M-Z modulator operates by dividing incoming light into two optical paths. Into one or both paths is placed a material that, in response to a control voltage, alters the phase of the light traveling through it. The two paths are then optically recombined to generate the final output. Phase differences between the two paths cause destructive interference, operating to reduce the intensity of the output. When the two paths are exactly one-half wavelength out of phase (a radians), destructive interference is complete and no light exits the modulator. When the two paths are in phase constructive interference occurs and the light exiting is equal in intensity to the incident light (minus small system losses). FIG. 1 plots the percentage of transmitted light at different control voltages. The transfer characteristic of the M-Z modulator is a raised cosine. The difference in drive voltage between the minimum and maximum transmission points is called $V\pi$ since it results in an optical phase change of $\pi$ radians. $V\pi$ is generally stable, however, the absolute voltage of the optical minimum and maximum drift with time, temperature, and other phenomenon.

Typically, commercial M-Z modulators are driven with two electrical signals. The first is a data drive signal that modulates the phase difference between the two paths. The second is a bias voltage that controls the average phase difference between the paths. These electrical drive components can be combined externally to the M-Z, and applied to a single electrode set, or can be effectively combined within the M-Z modulator (on separate data and bias electrode sets). This separation of data and bias signals generally simplifies the overall electrical drive system. The bias voltage circuitry corrects for the relatively slow drift due to time, temperature, etc., freeing the high-performance data drive circuitry from addressing these effects. In some M-Z modulators, the data drive signal consists of a plurality of wires that may be driven differentially, redundantly or complementarily. The methods described in this patent apply equally to M-Z modulators with one or more data drive wires.

Some systems modulate multiple bands of electrical information onto a single optical carrier frequency. These systems are most efficient when the transmitter has a linear transfer characteristic. This is best achieved with the M-Z modulator by setting the bias point at a 50% transmission level (labeled 'A' on FIG. 1) and using the data drive signal to vary the transmission symmetrically about this point. Additional linearity can be achieved by limiting the data drive signal variance to less than $V\pi$.

Other systems modulate the optical carrier with a single channel of digital electrical information. Increased data transmission rates are accomplished by increasing the electrical clock rate as well as the use of multiple modulators operating on multiple optical carriers of different frequencies (i.e., Wavelength Division Multiplexing). In these systems, linearity of the transmitter transfer characteristic is unimportant. Rather, the ability of the receiver to distinguish optical '1' from optical '0' must be maximized. We will call the ratio of the amplitude of the optical '1' to the amplitude of the optical '0' the extinction ratio. The higher the extinction ratio of the transmitter, the lower the required sensitivity of the receiver. The maximum extinction ratio is achieved by providing a data drive signal variance of $V\pi$ combined with appropriate biasing. The term '1' level or '0' level is used to indicate the optimal optical amplitude at the transmitter when sending a '1' bit or a '0' bit to the receiver.

In prior-art systems, the data drive signal varies symmetrically and the bias voltage is maintained at the 50% level. Many bias voltage regulation schemes are known, one example is U.S. Pat. No. 6,046,838 titled, AUTOMATIC BIAS CONTROL FOR ELECTRO-OPTIC MODULATORS. In general, two prior-art bias methods are known. Both techniques rely on injecting a low frequency control tone into the M-Z modulator, extracting a resulting component of the control tone from the output of the M-Z modulator and adjusting the bias voltage by processing the extracted component and optionally, the original control tone.

In one technique, a control tone is modulated onto the bias voltage. The bias voltage is adjusted to maximize the detected control tone component. FIG. 6 shows an example of this system. Laser 700 generates an optical carrier transmitted through M-Z modulator 710. M-Z modulator 710 modulates the carrier by combining data drive signal 760 and bias voltage 770. Bias voltage 770 is generated by combining the output of control tone oscillator 750 and feedback control 730. The output of the M-Z modulator 720 is monitored by photo-detector 720. Feedback control 730 extracts from photo-detector 720 the control tone component that is combined with the output of control tone oscillator 750 to generate the necessary bias adjustment.

In another technique, the data drive signal is modulated by a control tone. The extracted control tone is multiplied by the original control tone to generate an error signal. Feedback correction of the bias voltage is done using well-known control techniques like proportional and integrative.

Increasing the transmitted data rate faces two difficulties. First, the shorter electrical wavelength of the modulating signal shortens the practical active length of the M-Z waveguide causing $V\pi$ to increase. Second, it becomes increasingly difficult to achieve a particular voltage swing at higher electrical clock rates. These two difficulties combine to lower the actual data drive voltage swing below $V\pi$, reducing the extinction ratio. When the data drive voltage swing is less than $V\pi$, the system is said to be underdriven. One response to this effect is to increase the sensitivity required of the receiver. However, there are limits to receiver sensitivity due to a number of factors, including electrical noise in the photo-diode, optical noise injected by optical amplifiers in the transmission path and others. Consequently, it is desirable to maximize the extinction ratio of an M-Z modulator when the data drive voltage swing is less than $V\pi$. The optimal extinction ratio for an underdriven M-Z modulator is achieved when the bias point is not at the 50% transmission level of the prior-art.

A goal of the invention is maximize the extinction ratio when the M-Z modulator is underdriven.

SUMMARY OF INVENTION

The amplitude of control tone modulation of the zero and one levels of the M-Z control voltage is independently controlled. Detecting the results of the asymmetric control tone modulation allows the system to better control the extinction ratio.

In a preferred embodiment, all of the control tone modulation is placed onto the zero level. The system adjusts the M-Z bias point to maximize the extinction ratio.

DETAILED DESCRIPTION OF THE PREFERRED EMBODIMENT

A method and system for providing asymmetric control tone modulation is disclosed. In the following descriptions, numerous specific details are set forth, such as the specific rendering of the implementation, in order to provide a through understanding of the present invention. It will be apparent, however, to one skilled in the art that the present invention may be practiced without these specific details. In other instances, well-known circuits, control logic and coding techniques have not been shown in detail, in order to avoid unnecessarily obscuring the present invention.

Figure 1:
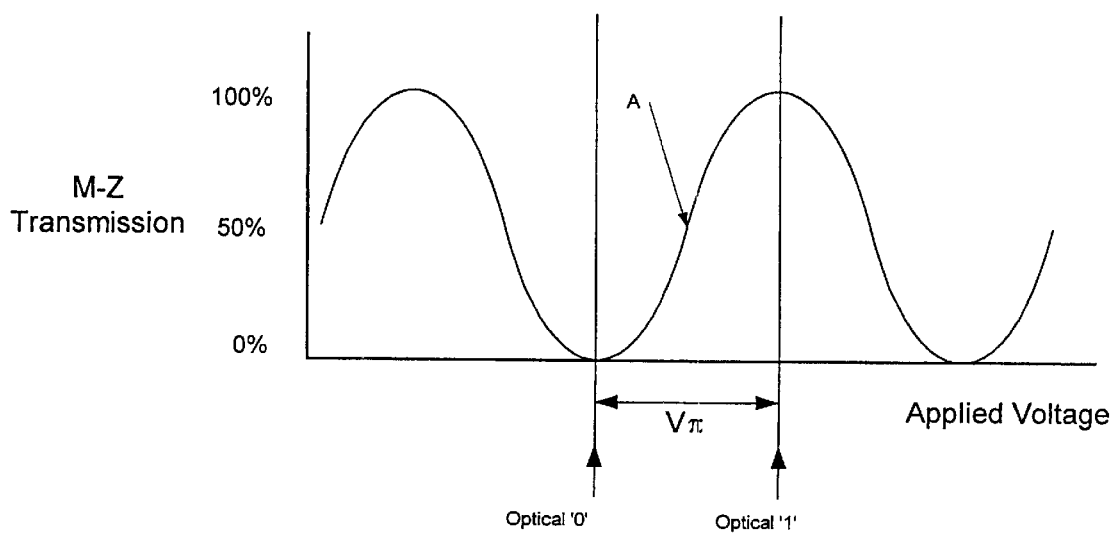
FIG. 1 shows the transfer characteristic of a Mach Zehnder optical modulator.

Examination of FIG. 1 shows that when the M-Z is underdriven, the maximum extinction ratio is achieved when the electrical '0' level corresponds to a minimum optical transmission point.

Figure 2:
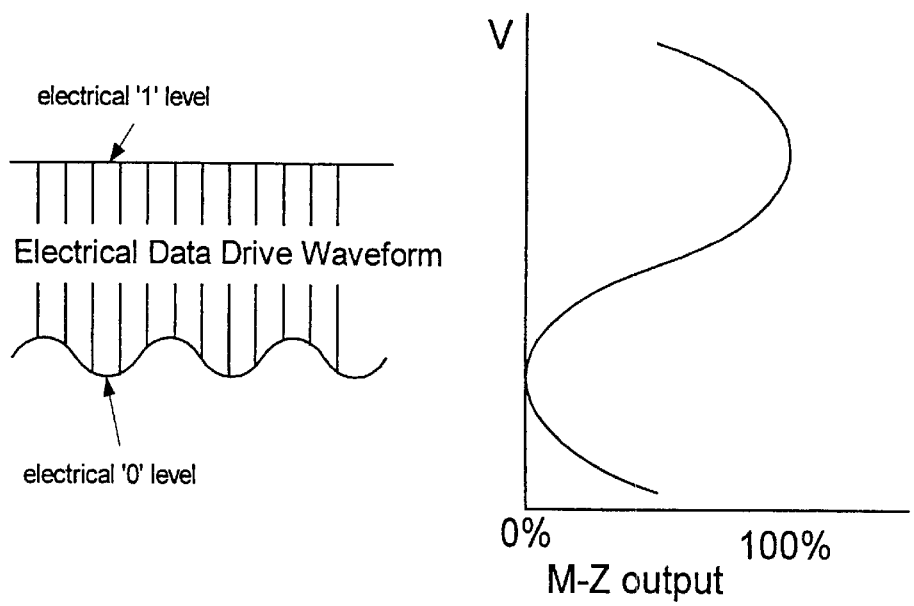
FIG. 2 shows control tone modulation on the '0' level and no control tone modulation on the '1' level.

Generating the bias voltage control signal is done by modulating a control tone onto the electrical '0' level only (asymmetric modulation). The electrical '1' level remains unaffected. FIG. 2 shows the resulting electrical waveform with all of the control tone modulation placed on the '0' level. This form of asymmetric modulation can be implemented by modulating the data drive amplitude with the control tone and modulating the bias voltage with anti-phase control tone. As the amplitude of the data is increased, the '1' level increases, the '0' level decreases and the bias voltage is decreased, resulting in a cancellation of the modulation of the '1' level and a corresponding increase in the modulation of the '0' level. Monitoring the M-Z output and extracting a component of the original control tone, combining this with the original control tone (preferably by multiplication) generates an error signal. The bias voltage generator uses well-known control algorithms such as proportional, integrative, etc. to adjust the bias voltage using the error signal.

Developments in optical receivers may create the desire for the transmitter to optimize other aspects of the transmitted light other than the extinction ratio. Applying the principal disclosed above creates alternate embodiments.

Figure 3:
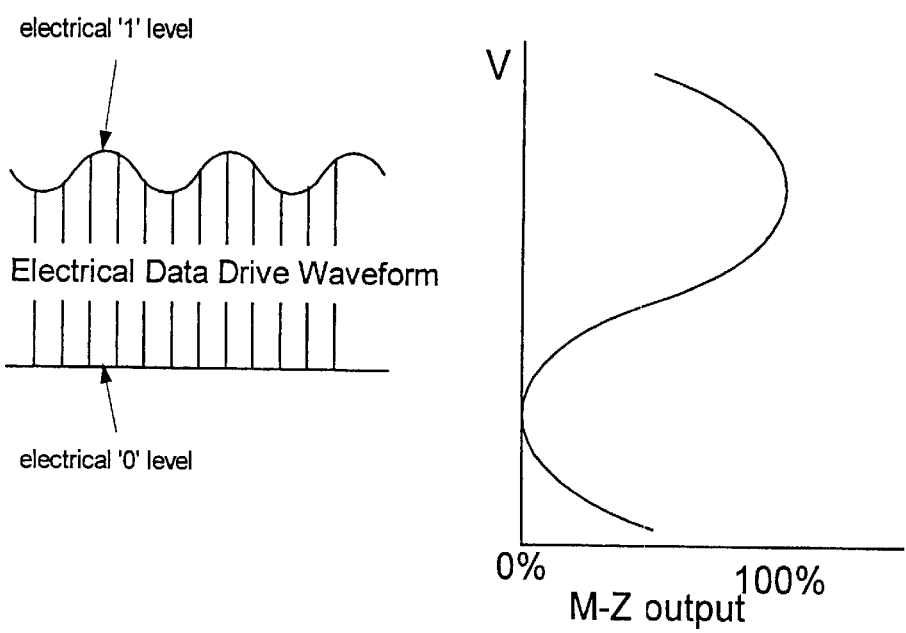
FIG. 3 shows control tone modulation on the '1' level and no control tone modulation on the '0' level.

It may be desirable for the transmitter to minimize the effects of patterning on the optical '1's. This can be accomplished by inverting the modulation scheme described above. In these systems, all control tone modulation is placed onto the electrical '1' level and none is placed onto the electrical '0' level. FIG. 3 shows the electrical data drive waveform for this case. This form of asymmetric modulation can be implemented by modulating the data drive amplitude with the control tone and modulating the bias voltage with an in-phase control tone. As the amplitude of the data is increased, the '1' level increases, the '0' level decreases and the bias voltage is increased, resulting in a cancellation of the modulation of the '0' level and a corresponding increase in the modulation of the '1' level. Monitoring the M-Z output and extracting a component of the original control tone, combining this with the original control tone (preferably by multiplication) generates an error signal. The bias voltage generator uses well-known control algorithms such as proportional, integrative, etc. to adjust the bias voltage using the error signal.

Figure 4:
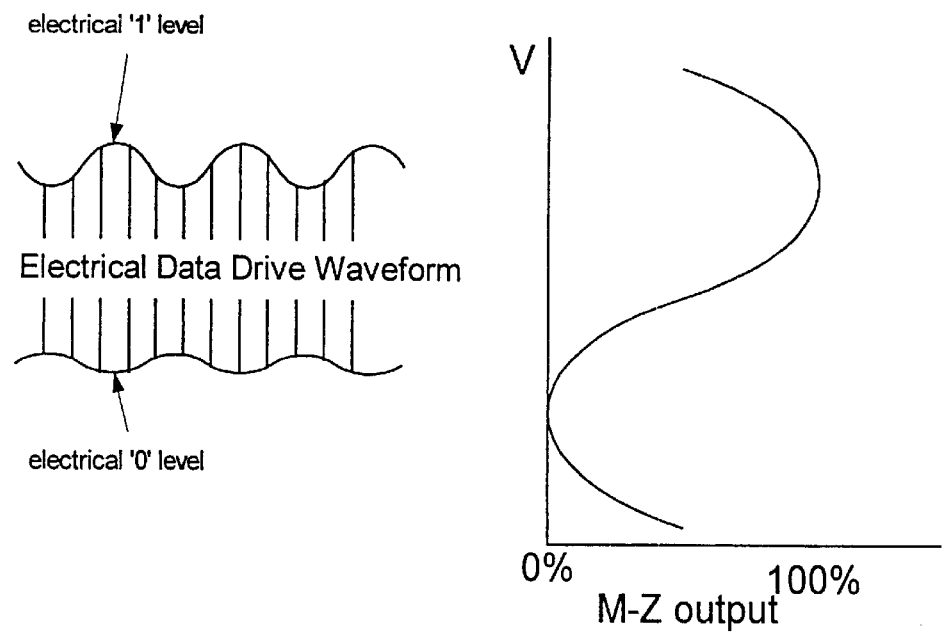
FIG. 4 shows asymmetric control tone modulation on both the '0' and '1' levels.

Intermediate forms of asymmetric modulation might also become desirable. The relative size of the modulation on the '0' and '1' levels can be adjusted to any ratio by tuning the relative sizes of the data drive amplitude modulation and the bias voltage modulation (including possible phase inversion of the control tone). The relative size of the modulation on the '0' and '1' levels determines the bias point that the control scheme settles to. FIG. 4 shows the electrical data drive waveform for this case. It can be shown that a component of the '1's control tone modulation that is extracted from the M-Z output is proportional to the modulation on the '1's level multiplied by the slope of the M-Z transfer function at the mean '1' level. Similarly, the detected control tone component due to the control tone modulation of the '0's level is proportional to the modulation of the '0's level multiplied by the slope of the M-Z transfer function at the mean '0's level. The two components are opposite in sign when they are on the same slope of the M-Z transfer function. Well-known control schemes are used to adjust the bias voltage so that the two components cancel each other, resulting in proper maintenance of the desired bias point. It should be noted that the first two biasing schemes described—all control tone modulation on the '0' level and all control tone modulation on the '1' level are simply special cases of the more general asymmetric modulation solution disclosed above.

It is well known in the art that it may be advantageous to use multiple control tones to provide additional control tone frequency components for the operation of the system. The methods and systems described above have a single control tone in order to simplify the description, however, it should be understood that the present invention is not limited to a single control tone. The methods described apply to systems using multiple control tones for bias adjustment.

The figures depicting the modulation schemes and the control tone terminology indicate the use of a sinusoidal modulation waveform. The present invention is not so limited. Alternate embodiments using other modulation techniques would work equally well—including, but not limited to: square wave modulation, code word modulation, and others.

Figure 5:
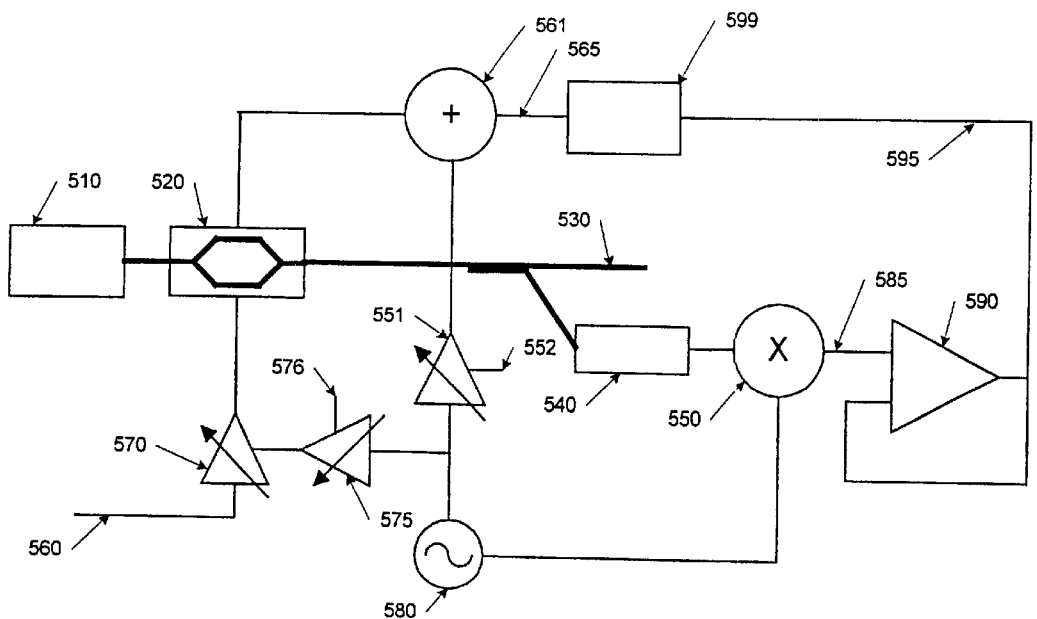
FIG. 5 shows one embodiment of the invention.
Figure 6:
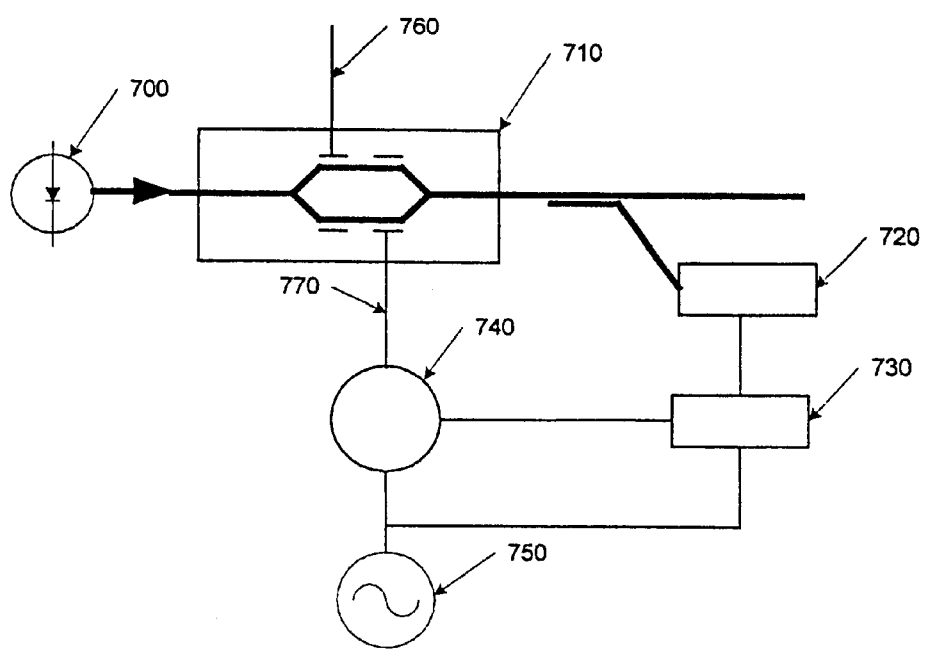
FIG. 6 shows a prior-art bias voltage generation circuit.

FIG. 5 shows a preferred embodiment, Laser 510 generates an optical carrier that is transmitted through M-Z modulator 520. Modulated light output from M-Z modulator 520 propagates through optical channel 530 for transmission. Electrical data signal 560 is input to data driver 570 whose amplitude is further modulated by the output of control tone attenuator 575. The output of data driver 570 generates the data drive signal to M-Z modulator 520. Control tone attenuator 575 outputs attenuated control tone as controlled by input control tone generator 580 and amplitude adjustment 576. Control tone component 585 is generated by multiplying the output of photo-detector 540 with control tone generator 580 via multiplier 550. Integrative control element 590 generates error signal 595 based on control tone component 585. Bias voltage generator 599 uses error signal 595 to generate bias voltage 565 to which is added via adder 561 the attenuated control tone output by control tone attenuator 551. Control tone attenuator 551 is controlled by amplitude adjustment 552 (in some embodiments, control tone attenuator 551 may invert its, input thereby generating an anti-phase control tone). As described above, amplitude adjustments 576 or 552 control the amount of control tone modulated onto the '0' and '1' levels.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of biasing an optical modulator comprising the steps of:

modulating one or more control tones asymmetrically onto an optical carrier producing an optical data stream;

processing said optical data stream to generate an error signal; and adjusting said modulating step as directed by said error signal.

2. The method of claim 1 wherein said one or more control tones are sinusoidal.

3. The method of claim 2 wherein said one or more control totes are square waves.

4. The method of claim 3 wherein said one or more control tones are code words.

5. The methods of claims 1, 2, 3, or 4 wherein said processing step further comprises comparing said one or more control tones to said optical data stream.

6. The methods of claims 1, 2, 3, or 4 wherein said modulating step modulates said one or more control tones substantially on the '0' level of said optical data stream.

7. The methods of claims 1, 2, 3, or 4 wherein said modulating step modulates said one or more control tones substantially on the '1' level of said optical data stream.

8. The methods of claims 1, 2, 3, or 4 wherein said modulating step results in the amount of said one or more control tones present on the '0' level of said optical data stream being unequal to the amount of said one or more control tones present on the '1' level of said optical data stream.

9. Tho methods of claims 1, 2, 3, or 4 wherein said modulating step results in substantially none of said one or more control tones present on the '0' level of said optical data stream.

10. The methods of claims 1, 2, 3, or 4 wherein said modulating step results in substantially none of said one or more control tones present on the '1' level of said optical data stream.

11. A system for biasing an optical modulator comprising:

an optical modulator for modulating one or more control tones onto an optical carrier generating an optical data stream;

a monitor coupled to said optical data stream and generating an error signal; and a bias generator coupled to said error signal generating a bias signal coupled to said optical modulator.

12. The system of claim 11 wherein said one or more control tones are sinusoidal.

13. The system of claim 11 wherein said one or more control tones are square waves.

14. The system of claim 11 wherein said one or more control tones are code words.

15. The systems of claims 11, 12, 13, or 14 wherein said monitor is coupled to said one or more control tones.

16. The systems of clams 11, 12, 13, or 14 wherein said optical modulator modulates said one or more control tones substantially on the '0' level of said optical data stream.

17. The systems of clams 11, 12, 13, or 14 wherein said optical modulator modulates said one or more control tones substantially on the '1' level of said optical data stream.

18. The systems of claims 11, 12, 13, or 14 wherein said optical modulator modulates the amount of said one or more control tones onto the '0' level of said optical data stream substantially unequal to tie amount of said one or more control tones onto the '1' level of said optical data stream.

19. The systems of claims 11, 12, 13, or 14 wherein said optical modulator modulates substantially none of said one or more control tones onto the '0' level of said optical data stream.

20. The systems of claims 11, 12, 13, or 14 wherein said optical modulator modulates substantially none of said one or more control tones onto the '1' level of said optical data stream.

\* \* \* \* \*